United States Patent [19]
McKenzie

[11] Patent Number: 6,143,335
[45] Date of Patent: Nov. 7, 2000

[54] SOLID NUTRITIONAL FOODS AND METHODS OF MAKING THE SAME

[75] Inventor: Russell G. McKenzie, Poteau, Okla.

[73] Assignee: McKenzie International, Inc., Poteau, Okla.

[21] Appl. No.: 09/237,749

[22] Filed: Jan. 26, 1999

[51] Int. Cl.7 .............................. A23K 1/175; A23L 1/30
[52] U.S. Cl. ..................... 426/72; 601/648; 601/658; 601/807; 601/661
[58] Field of Search .............................. 426/72, 807, 648, 426/601, 658, 661

[56] References Cited

U.S. PATENT DOCUMENTS

| | | | |
|---|---|---|---|
| 3,961,081 | 6/1976 | McKenzie | 426/635 |
| 3,966,993 | 6/1976 | Luck | 426/589 |
| 4,543,262 | 9/1985 | Michnowski | 426/306 |
| 4,565,702 | 1/1986 | Morley et al. | 426/93 |
| 4,605,561 | 8/1986 | Lang | 426/93 |
| 5,482,729 | 1/1996 | McKenzie et al. | 426/658 |
| 5,571,553 | 11/1996 | Stein | 426/607 |

*Primary Examiner*—Chhaya D. Sayala
*Attorney, Agent, or Firm*—Hovey, Williams, Timmons & Collins

[57] ABSTRACT

An improved solid, edible nutritional food such as a bar or cube for supplementing the diets of both humans and animals is provided. Broadly, the foods comprise bars which include a sugar-based sweetening ingredient, a quantity of fat, and a formulated quantity of various vitamins, minerals, medicaments, and/or other supplemental ingredients. The bars can be formulated to provide 100% of the daily requirements of the supplemental ingredients, or alternately can be formulated to provide extra amounts of a particular component which is lacking in the animal or human's diet. In one embodiment, the bars weigh approximately 1 lb. and are scored into bite-sized pieces for easy consumption, thus providing a method for delivering exact quantities of supplemental ingredients to animals or humans.

33 Claims, 1 Drawing Sheet

SOLID NUTRITIONAL FOODS AND METHODS OF MAKING THE SAME

BACKGROUND OF THE INVENTION

1. Field of the Invention

The present invention is broadly concerned with a solid nutritional food such as bars or cubes and methods of making the same. More particularly, the invention pertains to nutritional bars which can be formulated to provide 100% of the recommended daily allowances of various vitamins, minerals, and other supplements for animals or humans. In one embodiment, the bars of the invention provide nutritional components which are deficient in the animal or human's body or diet. In addition to the supplemental ingredients, the bars include a sugar-based sweetening ingredient and a quantity of a fat. In a preferred embodiment, the bars weigh about 1 lb. and are scored into forty, 1 inch×1 inch bite-size squares which can be readily consumed, thus ensuring delivery of the desired supplemental nutrients and ingredients.

2. Description of the Prior Art

Molasses-based feed supplements have long been used to enhance the diets of and to provide energy for livestock. Such supplements are commonly in the form of a solid block and are placed in a pasture or stockyard for ad libitum consumption by the animals. However, with prior art solid block supplements, it is extremely difficult if not impossible, for the animal to consume the required amount of daily vitamins and minerals. This difficulty arises from the fact that the prior art feed blocks are large and very hard, making it extremely difficult and often impossible for the animal to chew. Thus, the animal must lick the block in order to consume the supplemental ingredients. As a result, the farmer is unable to determine the quantity of vitamins and minerals consumed by the animal. Thus, the farmer cannot be certain that the animal has consumed the desired quantity of vitamins, minerals, and other supplements.

Human nutritional bars have been introduced which provide a portion of the minerals and vitamins recommended by the U.S. Government for good health. However, these bars have generally been high in moisture, resulting in a limited shelf life. Furthermore, these bars do not contain 100% of the RDA for humans of vitamins, minerals, and other supplements, nor do they contain varying levels of particular vitamins or minerals to compensate for deficiency of a certain vitamins or minerals in a particular person. Thus, a person with a calcium deficiency receives the same quantity of calcium from the prior art nutritional bars as a person who does not need additional calcium in his or her diet. Finally, many of the prior art bars have an unappealing taste, thus causing many people to avoid them.

There is a need for animal nutritional bars which can be formulated to provide high percentages of the RDA of vitamins and minerals as required by appropriate medical and governmental organizations. This bar should be easily adapted for human consumption, and should be capable of being specifically formulated to provide deficient vitamins, minerals, proteins, etc. to persons or animals having such a deficiency.

SUMMARY OF THE INVENTION

The instant invention overcomes these problems by providing a solid, low-moisture nutritional food (such as a bar or a cube) which can be formulated to provide 100% of the recommended daily allowances of various vitamins and minerals. Broadly, the foods of the invention comprise a sugar-based sweetening ingredient, a quantity of fat, and other desired nutrients such as proteins, vitamins, minerals, and additives.

In more detail, the foods of the invention preferably are in the form of bars which include from about 47–82% by weight, preferably from about 60–78% by weight, and more preferably from about 65–73% by weight of a sugar-based sweetening ingredient, based upon the total weight of the bar taken as 100% by weight. Preferred sweetening ingredients include those selected from the group consisting of molasses, corn syrup, and mixtures thereof. Molasses will typically be utilized in animal nutrition bars of the invention while corn syrup will be used in nutritional bars for humans. The sweetening ingredients can also be provided with flavorings (such as apple or licorice flavored bars for horses and humans) as may be desired for the particular application.

The bars generally include a total fat (as used herein, "fat" is intended to include both fats and oils) content of from about 2.0–12.0% by weight, and preferably from about 3.0–5.0% by weight, based upon the total weight of the bar taken as 100% by weight. At least a portion of this fat is preferably an edible, hydrogenated vegetable oil or a product derived from such a vegetable oil. The hydrogenated vegetable oil should be present at a level of from about 0.5–1.0% by weight, and preferably from about 0.7–0.8% by weight, based upon the total weight of the bar taken as 100% by weight. The hydrogenated vegetable oil acts as a moisture barrier and lubricant for the bars. One preferred commercially available product is Sets-Quick™, available from Henry H. Ottens Mfg. Co., Inc., Philadelphia, Pa.

With respect to the fat contained in the bars that is not a hydrogenated vegetable oil and is not derived from a hydrogenated vegetable oil, it is preferred that this fat be a liquid at room temperature. One preferred such fat is soybean oil.

The vitamins and minerals ("minerals" as used herein includes macro- and micro-nutrients) are preferably present in the bars of the invention at a level of from about 7.5–12.5% by weight, preferably from about 8.5–11.5% by weight, and more preferably from about 10.0–11.0% by weight, based upon the total weight of the bar taken as 100% by weight. Any vitamins or minerals can be added to the bar as desired, including but not limited to magnesium, selenium, calcium, copper, and both fat soluble and water soluble vitamins. Those skilled in the art will appreciate that, in addition to vitamins and minerals, the bars of the invention can also be used to supply amino acids or large quantities of protein, as well as medicaments such as antibiotics, worming compounds, growth promoters, direct fed microbials, enzymes, other natural medicaments and mixtures of all of the above.

The bars of the invention are unique in that they can be formulated into very nutrient dense bars weighing from about 0.9–1.1 lbs each, and preferably about 1 lb each. Preferably, these bars are scored (as are Hershey's™ candy bars and baker's chocolate) into bite-size squares which can easily be broken apart and consumed. The bars of the invention are about ½ inch thick, with each of the scored pieces being about 1 inch×1 inch square. The scored pieces will generally weigh from about 0.35–0.45 ounces each, and preferably about 0.40 ounces each. Each bar will usually contain 40 such scored pieces and have overall dimensions of about 8 inches×5 inches× by ½ inch thick.

In order to ensure a long shelf life, the bars should have a total moisture content of less than about 5% by weight, and preferably from about 2–4% by weight, based upon the total weight of the bar taken as 100% by weight. The water activity of the bars of the invention is less than about 0.47, and preferably less than about 0.43. The density (as used herein, "density" is intended to mean actual density rather than bulk density) of the bars is from about 65–80 lbs/ft$^3$, and preferably from about 70–75 lbs/ft$^3$.

It will be appreciated that the bars of the invention can be used to provide at least about 95%, and preferably at least about 100%, of the RDA of various components to animals as well as humans. Furthermore, the bars can be specially formulated as necessary to provide components for which the animal or human has a particular need. For example, the bars can be manufactured to provide an increased amount of selenium for animals with a selenium deficiency. Also, the bars of the invention are extremely beneficial for humans in third world countries who receive inadequate daily quantities of protein. Instead of only receiving an estimated 2 grams of protein per day, the people in such countries could be provided with the bars of the invention formulated to contain about 15% protein (or about 68 grams of protein).

Another benefit of the instant invention is that, by providing bars which can be broken into bite-size pieces, the bars can be completely consumed at one sitting. Thus, the farmer will know the exact amount of various vitamins, nutrients, medicaments, minerals, or other components that an animal is consuming. In fact, the farmer can be certain that the animal is getting all of the particular component that is desired. This is true as well for humans who consume the nutritional bars of the invention. Also, because the bars include a sweetening ingredient, the taste of what would otherwise be a distasteful ingredient is disguised, making the bars appealing to the animals or humans who consume them.

The bars of the invention are made by forming a mixture comprising the sugar-based sweetening ingredient and fat, followed by cooking the resulting liquid mixture. The cooked mixture is then cooled prior to mixing with the supplemental ingredients in order to minimize or prevent degradation of these ingredients. The dry ingredients (vitamins, minerals, nutrients, antibiotics, medicaments (including natural medicaments), worming compounds, etc. and a fiber and protein source such as soybean meal) are then mixed with the materials at a level of from about 10–47% by weight dry ingredients, preferably from about 25–38% by weight dry ingredients, and more preferably from about 30–35% by weight dry ingredients, based upon the total weight of all ingredients used taken as 100% by weight. As discussed above, the dry ingredients can be formulated as necessary for the particular application for which the bar is being used.

The resulting mixture is then formed into ½ inch thick sheets and cooled. In order to prevent degradation of the nutritional components, it is critical that the temperature of the mixture never increases once the dry ingredients are mixed with the cooled, previously cooked liquid mixture. The cooled sheets are formed into bars and scored into bite-size pieces. Preferably, the scored bars are then brushed with a moisture sealant and food lubricant in order to further seal the product and assist in handling of the bars. The preferred sealants and lubricants are edible hydrocarbon blends such as the commercially available product, Lubrite™ (Ivory-Sol ISO 32, from Momar, Inc., Atlanta, Ga.).

The scored bars are then further cooled until the temperature of the scored bars reaches from about 40–65° F. At this point, the bars should have a hardness (as measured by a Model 1500A#A-0692 durometer from Rex Gage Co., Buffalo Groves, Ill.) of at least about 70, and preferably from about 85–95, in order to properly score the material. The formed, self-sustaining bars are then packaged, resulting in a product that has a shelf life of at least about 12 months, and preferably at least about 24 months, particularly when stored in a cool, dry environment.

DETAILED DESCRIPTION OF THE PREFERRED EMBODIMENTS

Figure 1:
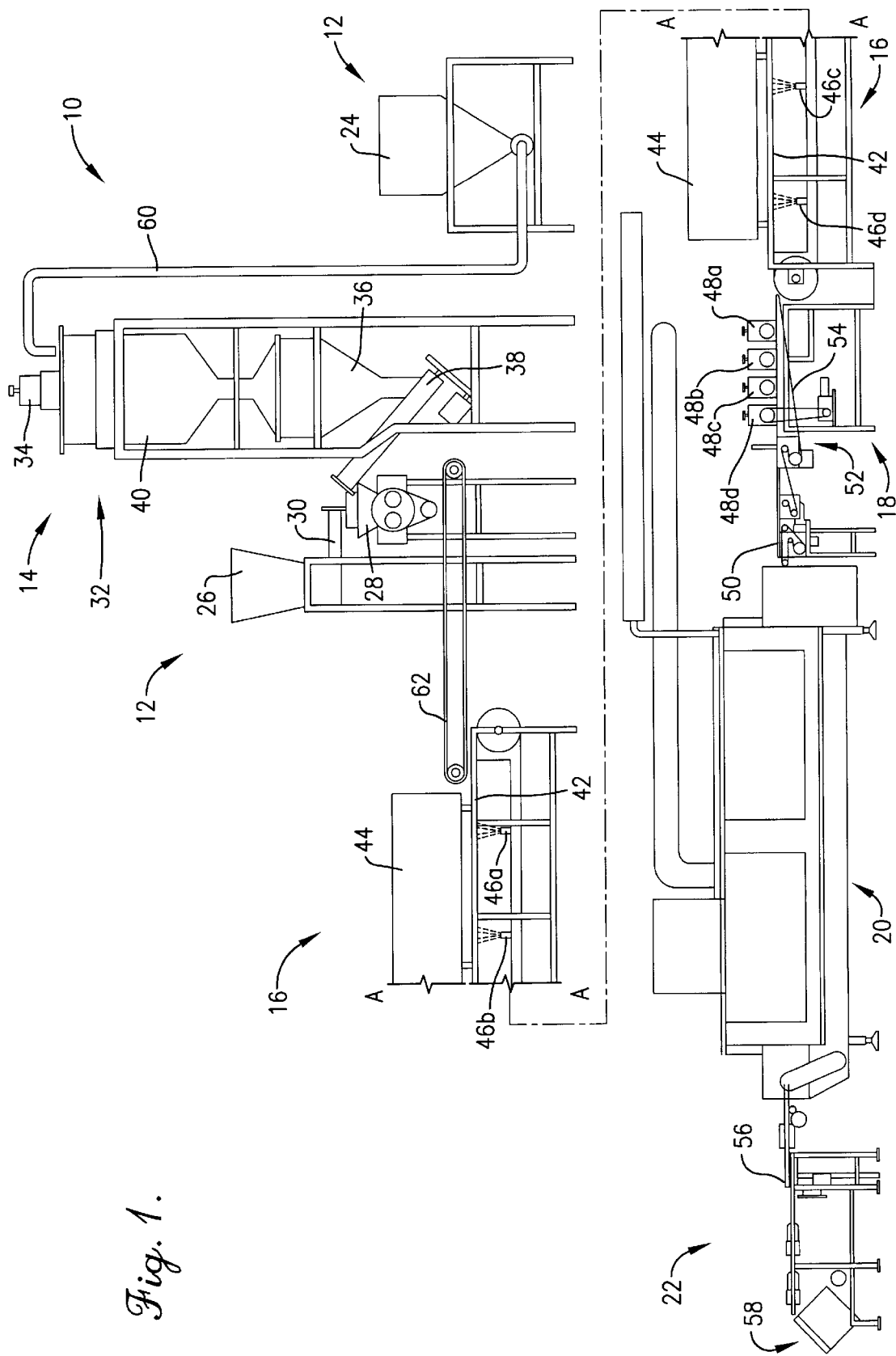
FIG. 1 is a schematic illustration of the equipment utilized in the processes of the invention to form the nutritional bars of the invention.

Turning now to FIG. 1, a batch apparatus 10 for the production of the animal nutrition bars of the invention is illustrated. For ease of illustration, the apparatus 10 is separated into two parts along continuity line A—A. Broadly speaking, the apparatus 10 includes an ingredient metering and mixing assembly 12, a liquid ingredient cooking section 14, a cooling conveyer 16, a wafer-forming apparatus 18, a cooling tunnel 20, and a packaging assembly 22. The apparatus 10 is designed for the batch-type production of nutrient bars (particularly bars for horses) which provide the RDA for minerals and vitamins.

In more detail, the assembly 12 includes a batch scale 24, a dry feed hopper 26, and a double screw extruder 28. Hopper 26 includes dry feed auger 30. The cooking section 14 contains a mixing cooker 32 equipped with a beater drive 34 and a negative pressure tank 36 which includes an auger 38. The cooker 32 is designed for cooking of the premixed ingredients received from scale 24. To this end, the cooker 32 includes a tank 40 having an exterior steam jacket and internal mixer (not shown) coupled with beater drive 34.

Cooling conveyer 16 includes a belt 42, a cooling hood 44, and water jets 46a, 46b, 46c, 46d. Cooling hood 44 is positioned directly above belt 42 and contains fans for circulating $CO_2$ against and adjacent the cooked sheet of materials. Waterjets 46a–d are positioned immediately below the upper run of conveyer 16, and are designed to spray cool water against the bottom surface of the upper run.

Wafer-forming apparatus 18 includes four roll formers 48a, 48b, 48c, and 48d, a one-to-six lane indexer 50, and a conveyer 52 equipped a belt 54. Belt 54 has an elongated recess which is 5 inches wide and ½ inch deep for the formation of cooked sheets of the nutrient material in the manner to be described.

Assembly 22 includes a six-to-one lane merger 56 and a packaging machine 58. Machine 58 is of conventional configuration and is designed to receive cooled and formed nutrient bars from merger 56. The machine 58 is operable for packaging one or a plurality of the finished bars into individual packages.

In operation, the desired quantity of molasses and fats is pumped from scale 24 into tank 40 of cooker 32 via conduit 60. The beater drive 34 is turned on and mixing is commenced. While most conventional mixing cookers are suitable for use in the instant invention, it is particularly preferred that the cooker be heated via steam jackets and that the mixing mechanism of the cooker be capable of moving a portion of the mixture from the bottom of, and up through the middle of tank 40, and depositing that portion of the mixture towards the outer walls of tank 40. Mixing is continued while the molasses/fat mixture is heated to a mixture temperature of from about 240–280° F., preferably from about 250–265° F., and more preferably from about 255–260° F. Preferably, the mixture is heated to these temperatures in a time period of from about 25–65 minutes, and from about 40–47 minutes.

After heating and mixing is complete, a valve (not shown) at the bottom of tank 40 is opened. The cooked material is pulled from tank 40 under a negative pressure of from about 20–30 psi, and preferably about 25–27 psi, into tank 36 where the cooked material is held for a time period of from about 6–10 minutes, and preferably for about 8 minutes, while being subjected to the negative pressure. The use of such a negative pressure assists in cooling the cooked material as well as in removing moisture from the material.

The material then exits tank 36 and is transported via auger 38 to the forward portion of the inlet of extruder 28. As the cooked material is transported to the auger, the material should have a temperature of from about 125–150° F., and preferably from about 130–140° F. The dry materials (i.e., soybean meal, vitamin/mineral mixes, etc.) are metered from hopper 26 and transported via auger 30 to the rearward portion of the inlet of extruder 28, so that the dry ingredients are fed into extruder 28 (equipped with a nose cone having a 5 inch×½ inch outlet) directly behind the cooked material. The twin screws of extruder 28 are rotated at a speed of from about 9–12 rpm, thus forming a mixture comprising the dry materials and the cooked material, and transporting that mixture through the barrel of extruder 28 and onto conveyor 62 which transports the mixture to belt 42 of cooling conveyor 16.

The mixture is deposited on belt 42 so that a 5 inches wide and ½ inch thick sheet of the mixture is formed on belt 42. The sheet is cooled by liquid $CO_2$ which is blown against the sheet by the fans within hood 44, and by water which is sprayed from water jets 46a–d against the bottom of the upper run of conveyor 16. Upon exiting conveyor 16, the sheet should have a temperature of from about 90–120° F., and preferably from about 100–110° F.

The cooled sheet is then transported to the wafer-forming apparatus 18 where it is scored into approximately 8 inch×5 inch bars having forty, 1 inch×1 inch squares. Any conventional scoring device is suitable for use as apparatus 18, including those devices used to score candy bars or baker's chocolate. In the embodiment illustrated in the figure, roll former 48a is designed to verify that the sheet dimensions are 5 inches wide×½ inch thick. Roll former 48b then scores the sheet lengthwise at 1 inch intervals after which roll former 48c scores the sheet crosswise, thus forming the 1-inch square, scored portions. Roll former 48d then cuts the scored sheet into bars having a length of 8 inches. As the scored bars exit apparatus 18, they are brushed with a sealant and lubricant (such as an edible hydrocarbon blend) for further sealing and preserving the bars.

The indexer 50 situates the scored bars in rows of six for passing through conventional liquid $CO_2$ cooling tunnel 20. The residence time of the bars within tunnel 20 is from about 8–14 minutes, and preferably from about 11–12 minutes. While in tunnel 20, the bars are cooled to a temperature of from about 30–65° F., and preferably from about 50–60° F. As the cooled bars exit tunnel 20, merger 56 places the bars in single file to be delivered to packaging machine 58 for packaging.

EXAMPLES

The following example sets forth preferred methods in accordance with the invention. It is to be understood, however, that this example is provided by way of illustration and nothing therein should be taken as a limitation upon the overall scope of the invention.

Example 1

In this example, a horse nutrition bar was prepared using the following ingredients: high brix cane molasses—484 lbs; soybean oil—20 lbs; soybean meal—100 lbs; vitamin/mineral premix—70 lbs, and 4.5 lbs of powdered Sets-Quick™ (available from Henry H. Ottens Mfg. Co., Philadelphia, Pa.). The apparatus depicted in FIG. 1 was used.

In the preparation of the nutrition bar, the molasses and soybean oil were mixed together in a premix tank to achieve a substantially homogenous blend. This mixture was then pumped to a mixing cooker where it was cooked by subjecting the mixture to a continually increasing temperature, until the temperature of the material reached 260° F. (about 45 minutes). When the material reached 260°F., a valve was opened on the cooker, and the cooked mixture was transferred to a tank at a negative pressure of about 22–27 psi, where the mixture was held for about 8 minutes. The cooked mixture was then transferred to a double screw extruder by opening the tank chamber outlet valve. The dry ingredients were added to the double screw extruder just behind the cooked mixture and the screws were rotated for blending together the dry ingredients and the cooked mixture.

The double screw extruder moved the blended materials, comprising the cooked molasses, vegetable fat mixture, and the dried ingredients, to a cooling conveyor. The blended materials were deposited on the upper run of the conveyor in a sheet that was 5 inches wide by ½ inch thick. The sheet was transferred through the cooler while being subjected to liquid carbon dioxide blown against the sheet and water sprayed against the bottom of the upper run by water jets. Upon emerging from the cooler, the sheets of blended materials had a temperature of about 104° F. The cooled sheets were then transferred to a wafer-forming conveyor which was run at a speed of about 5–8 feet per minute. The conveyor formed the sheet of blended materials into finished bars having overall dimensions of 5 inches×8 inches×½ inch in size. During formation, the bars were scored so that they could be readily broken down into 1 inch×1 inch×½ inch square pieces for easy consumption by a horse. The bars were brushed with Lubrite™ to further seal the product, thus assisting in enhancing the product's shelf life.

The wafer-forming conveyor then moved the scored product into a cooling tunnel which used liquid carbon dioxide to cool the bars from an incoming temperature of about 104° F. to about 56° F. The hardness of the bars was determined (by a durometer) to be about 90. The finished bars were moved to the packaging machine for final packaging.

The preferred final product of the invention for use in feeding horses has the following nutrient profile:

| | |
|---|---|
| Crude Protein | 10% |
| Lysine | 0.7% |
| Calcium | 1.8% |
| Phosphorous | 1.4% |
| Magnesium | 0.5% |
| Potassium | 2.0% |
| Sodium | 0.05% |
| Sulfur | 0.2% |
| Iron | 500 mg/lb |
| Zinc | 500 mg/lb |
| Copper | 125 mg/lb |

-continued

| | |
|---|---|
| Manganese | 500 mg/lb |
| Iodine | 1.6 mg/lb |
| Cobalt | 2.1 mg/lb |
| Selenium | 1.8 mg/lb |
| Vitamin A | 55 KIU/lb |
| Vitamin D | 5.5 KIU/lb |
| Vitamin E | 450 IU/lb |
| Vitamin B12 | 190 mcg/lb |
| Riboflavin | 60 mg/lb |
| d-Pantothenic Acid | 125 mg/lb |
| Choline | 3850 mg/lb |
| Niacin | 330 mg/lb |
| Thiamine | 50 mg/lb |
| Pyridoxine | 40 mg/lb |
| Biotin | 2 mg/lb |
| Folic Acid | 18 mg/lb |

I claim:

1. An edible nutritional food in the form of a solid, self-sustaining body comprising:
   a sugar-based sweetening ingredient;
   a quantity of fat, at least a portion of said fat being a hydrogenated vegetable oil; and
   a quantity of a supplement mixed with said sweetening ingredient and fat, said supplement comprising vitamins and minerals,
   said sweetening ingredient being present in said bar at a level of from about 47–82% by weight, based upon the total weight of the bar taken as 100% by weight,
   said bar having a hardness of at least about 70 and a total moisture content of less than about 5% by weight, based upon the total weight of the bar taken as 100% by weight.

2. The food of claim 1, said sweetening ingredient being selected from the group consisting of molasses, corn syrup, and mixtures thereof.

3. The food of claim 1, said sweetening ingredient having a flavor selected from the group consisting of apple and licorice flavors.

4. The food of claim 1, said sweetening ingredient being present in said body at a level of from about 60–78% by weight, based upon the total weight of the body taken as 100% by weight.

5. The food of claim 1, said total fat content being from about 2.0–12.0% by weight, based upon the total weight of the body taken as 100% by weight.

6. The food of claim 1, said hydrogenated vegetable oil being present in said body at a level of from about 0.5–1.0% by weight, based upon the total weight of the body taken as 100% by weight.

7. The food of claim 1, said body weighing from about 0.9–1.1 lbs.

8. The food of claim 1, said vitamin and mineral supplement being present in said body at a level of from about 7.5–12.5% by weight, based upon the total weight of the body taken as 100% by weight.

9. The food of claim 1, said sweetening ingredient and fat being cooked.

10. The food of claim 1, said body being in form of a bar comprising a plurality of scored sections.

11. The food of claim 10, said bar comprising 40 scored section, each of said sections weighing from about 0.35–0.45 ounces.

12. The food of claim 1, said fat other than said hydrogenated vegetable oil being liquid at room temperature.

13. The food of claim 12, said fat comprising soybean oil.

14. The food of claim 1, said body being for consumption by an animal or a human and being formulated to provide at least about 95% of the daily requirement of vitamins and minerals for said animal or human.

15. The food of claim 1, said body being for consumption by an animal or a human, said animal or human being deficient of a compound selected from the group consisting of proteins, fats, vitamins, minerals, nutrients, and mixtures thereof, and said body being formulated to provide at least a portion of said deficient compound to said animal or human.

16. The food of claim 1, said body having a water activity of less than about 0.47.

17. The food of claim 1, said body having an actual density of from about 65–80 lbs/ft$^3$.

18. The food of claim 1, said supplement further including a compound selected from the group consisting of antibiotics, growth promoters, worming compounds, direct fed microbials, medicaments, and mixtures thereof.

19. The food of claim 1, said body having a shelf life of at least about 12 months.

20. The food of claim 18, wherein said compound is a natural medicament.

21. A method of forming a nutritional food product comprising the steps of:
   (a) forming a mixture comprising a sugar-based sweetening ingredient and a quantity of fat, at least a portion of said fat being a hydrogenated vegetable oil;
   (b) cooking said mixture by heating to a temperature of from about 240–280° F. to yield a cooked liquid mixture;
   (c) mixing said liquid mixture with a quantity of dry materials including an ingredient selected from the group consisting of vitamins, minerals, proteins, and mixtures thereof;
   (d) cooling said mixture resulting from step (c) to a temperature of from about 90–120° F. to form a pliable sheet of material; and
   (e) forming said sheet of material into edible portions having a hardness of at least about 70, said sweetening ingredient being added in step (a) at a level of from about 47–82% by weight, based upon the total weight of all ingredients used taken as 100% by weight.

22. The method of claim 21, wherein said dry materials are added in step (c) at a level of from about 25–38% by weight, based upon the total weight of all ingredients used taken as 100% by weight.

23. The method of claim 21, wherein said sweetening ingredient is selected from the group consisting of molasses, corn syrup, and mixtures thereof.

24. The method of claim 21, wherein said forming step results in bars each weighing from about 0.9–1.1 lbs and each comprising a plurality of sections, each of said sections weighing from about 0.35–0.45 ounces.

25. The method of claim 21, said hydrogenated vegetable oil being added in step (a) at a level of from about 0.5–1.0% by weight, based upon the total weight of all ingredients used taken as 100% by weight.

26. The method of claim 21, said ingredient of step (c) comprising a mixture of vitamins and minerals, said vitamin and mineral mixture being added in step (c) at a level of from about 7.5–12.5% by weight, based upon the total weight of all ingredients used taken as 100% by weight.

27. The method of claim 21, further including the step of cooling the portions resulting from step (e) to a temperature of from about 30–65° F.

28. The method of claim 21, wherein step (c) further comprises adding dry materials so as to provide at least about 95% of the daily requirement of vitamins and minerals for an animal or a human.

29. The method of claim 21, wherein step (c) further comprises adding dry materials including a compound selected from the group consisting of proteins, fats, vitamins, minerals, nutrients, and mixtures thereof, in sufficient quantities to provide at least a portion of said compound to an animal or a human deficient in said compound.

30. The method of claim 21, wherein said liquid mixture has a temperature of from about 125–150° F. during said mixing step (c).

31. The method of claim 30, wherein the temperature of the mixture resulting from step (c) does not increase during the remainder of said method steps.

32. A method of providing nutrition to an animal or human comprising the step of feeding a nutritional food in accordance with claim 1 to said animal or human.

33. An edible nutritional food in the form of a solid, self-sustaining body in accordance with claim 21.

* * * * *